United States Patent Office 3,408,879
Patented Nov. 5, 1968

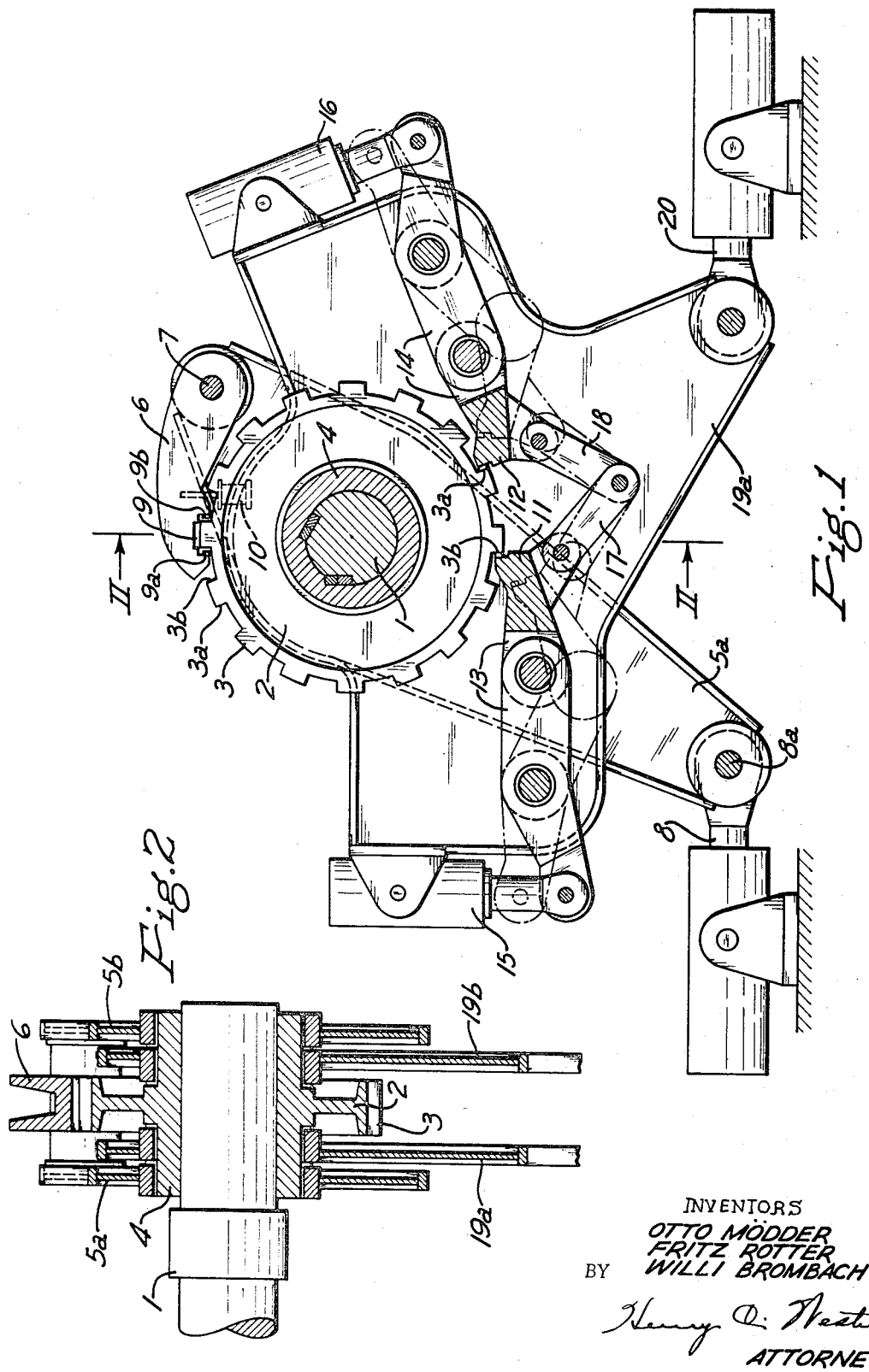

3,408,879
RATCHET DRIVE FOR WORKPIECE
CONVEYING APPARATUS
Otto Mödder, Dahlbruch, Kreis Siegen, Fritz Rotter, Kredenbach, Kreis Siegen, and Willi Brombach, Dahlbruch, Kreis Siegen, Germany, assignors to Siegener Maschinenbau G.m.b.H., a corporation of Germany
Filed Feb. 21, 1966, Ser. No. 528,954
Claims priority, application Germany, Feb. 25, 1965, S 95,667
6 Claims. (Cl. 74—129)

ABSTRACT OF THE DISCLOSURE

The invention relates to a stepping mechanism for an apparatus formed by spoke wheels turning on a common horizontal shaft for the cooling, hardening and/or conveying of rolled stock, in which on the drive shaft a ratchet wheel is fixedly mounted, that is movable step-by-step by means of a driving mechanism through a ratchet pawl and whereby associated with the latter are two tonguelike centering and holding pawls moving against one another and independently of the ratchet pawl into the ratchet wheel and which, alternating with the ratchet pawl, can be engaged with and disengaged from the ratchet wheel.

---

The apparatuses formed by turning spoke wheels for the cooling, hardening or conveying of rolled materials are being employed wherever rolled stock, such as slabs or billets, are to be moved perpendicular to their longitudinal axis and in connection therewith lowered into a tank filled with cooling or hardening fluid and removed therefrom. Such conveying apparatuses can also be used for the turning over of rolled material.

For the purpose of transportation, individual lengths of rolled material are shoved in from the side through the clearances of the spoke wheels. For that purpose it is necessary to turn the spoke wheels stepwise by the distance of one spoke clearance, so that all the spoke clearances of the wheels can be fed one after another with rolled material. As one length of rolled material is shoved in on the one side of the spoke wheels, another length of rolled stock is pushed out through the spoke clearance of the wheels at a diametrically opposite point.

For the step-by-step advance of the conveying apparatus formed by the spoke wheels, it is self-suggesting to use a stepping gear consisting of a ratchet wheel mounted on the drive shaft and a ratchet pawl cooperating with the latter and whereby the ratchet pawl through a driving mechanism, e.g. a piston cylinder unit, is moved to and fro. At the start of the forward motion of the ratchet pawl the latter engages with the ratchet wheel and moves it along together with the spoke wheels by a distance determined by the length of stroke of the driving mechanism. With the backward motion, on the other hand, the ratchet pawl is lifted out of the ratchet wheel, so that the operating connection between the latter and the ratchet pawl is canceled out.

Since at least at the beginning of the feed operation the conveying apparatus is unilaterally under load, unintentional turning of the spoke wheels must be prevented whenever the ratchet pawl is lifted off the ratchet wheel and moved back in order to perform a new step. Unintentional movement of the spoke wheels during lifting of the ratchet pawl can be avoided by associating a lock pawl with the ratchet wheel.

Stepping and locking mechanisms of the familiar design, however, are not suitable for use in connection with spoke-wheel conveying devices for rolled material, because with them it is essential, during the entry of the rolled stock into and its discharge from the individual spoke clearances, that the spoke wheel each time is centered accurately and securely in a predetermined rotary position. This is necessary for the reason that during its entry or exit the rolled material must be prevented from striking against the spoke wheel periphery or against the stationary guides adjacent thereto, thereby causing damage or destruction to the conveying apparatus.

In order to center accurately the feed and discharge position of the individual spoke clearances and to block the spoke wheels against turning during the feed and discharge operation, the use of a step-by-step gear in connection with spoke-wheel conveying apparatuses has already been proposed, in which with the ratchet pawl there are associated two tonguelike centering and holding pawls movable against one another and independently of the ratchet pawl into the ratchet wheel, which alternating with the ratchet pawl can be interlocked with and released from the ratchet wheel. Through the tonguelike centering and holding pawls movable against one another, the spoke wheels can be accurately fixed after each step provoked by the ratchet pawl, so that each spoke clearance is maintained exactly in the feed and discharge position. A drawback of this stepping gear, however, still lies in the fact that the speed of the step-sequence is relatively low, because after each move of the stepping gear a no-load or idle step equally long as to time must follow, in order to bring the ratchet pawl into the retracted position enabling to perform another forward step.

The purpose of the invention is to eliminate this drawback and it is based, therefore, on the problem of creating a step-by-step mechanism for conveying apparatuses, say for example, having a spoke wheel turning on a horizontal shaft for the cooling, hardening and/or conveying of rolled material, with the aid of which the step-by-step sequential speed can be raised to a degree where the steps can be performed practically following one another directly. The solution principle to this problem according to the invention is characterized essentially by the fact that the ratchet pawl, on the one hand, and the two centering and holding pawls, on the other hand, are mounted on arms pivoting around the drive shaft and these arms in reciprocal alternation through adjusting drives perform a limited to-and-fro motion around the drive shaft. In this connection there is further advantage for both the ratchet pawl and the centering and holding pawls to be supported on the arms by power drives enabling them to be engaged and disengaged in relation to the ratchet wheel. It is also advantageous according to the invention to arrange the centering and holding pawls somewhat diametrically opposed to the ratchet pawl at the periphery of the ratchet wheel.

As drive units for the arms and pawls one may provide according to the invention pressure-medium cylinders, electric or electrohydraulic or electropneumatic lifting motors.

Another advantage of the invention consists of coupling the centering and holding pawls through toggle joints with the respective drive units, whereby with the centering and holding pawls engaged, the toggle joints are in a straightened out position. Thereby the drive units for the pawls are fully relieved of the occurring operating or switch forces, because the latter are absorbed by the stretched toggle joints.

A final feature relates to the fact that each arm consists of two members, one of each being mounted on either side of the ratchet wheel whereby the members of the ratchet pawl are positioned between the members of the centering and holding pawls.

With a step-by-step gear according to the invention one may, in lieu of a saw-toothed ratchet wheel, use a wheel with rectangular or lug-type teeth and the ratchet pawl can be so designed that with each switch step it embraces a lug of the ratchet wheel radially from the outside on both flanks.

The drawing represents a preferred embodiment of a step-by-step gear according to the invention, in which:

FIGURE 1 shows a stepping gear in side elevation and partially in section, and

FIGURE 2 a section along line II—II through the arrangement according to FIGURE 1.

The drawing shows that a ratchet wheel 2 is fixedly keyed to a rotating drive shaft 1 carrying a spoke wheel (not shown) of the conveying apparatus, said wheel being provided with lug-type teeth 3 directed radially upwardly and uniformly distributed on its periphery. The two lateral flanks 3a and 3b of each rectangular tooth proceed parallel with one another and parallel to a plane intersecting the longitudinal axis of the shaft 1. Mounted on the hub 4 of the ratchet wheel 2 and limited to the latter and to the shaft 1 is an arm 5, movable back and forth, on whose one end a ratchet pawl 6 is pivotally carried and suspended by a pin 7 and on whose other end the push and pull rod 8 of a drive unit, e.g. the piston rod of a pressure-medium cylinder, engages. The ratchet pawl 6 has a lateral cutout 9 whose contour is adapted with slight play to the shape of the lug-type pawl teeth 3.

Through a drive unit 10 mounted on the arm 5 and engaging the ratchet pawl 6, e.g. a pressure-medium cylinder, the ratchet pawl 6 together with its carrier cutout 9 can be selectively engaged with or disengaged from a tooth 3 of the ratchet wheel. In connection therewith the engagement of the carrier-cutout 9 with a tooth 3 of the ratchet wheel 2 occurs as a rule in the one end swivel position of the arm 5, whereas the ratchet pawl 6 is disengaged in the other end swivel position of the arm 5. During the movement of the arm 5 through the drive unit 8 the ratchet pawl 6 is always engaged with the ratchet wheel 2, so that through the ratchet wheel 2 the shaft 1, and with the latter the spoke wheels mounted thereon, is turned by a predetermined angular displacement purposely equal to the tooth division. During the return movement of the arm 5 the ratchet pawl 6 is disengaged in relation thereto, so that the ratchet wheel 2 together with the shaft 1 will not participate in this swing-back. At the beginning of the next forward movement of the arm 5 the ratchet pawl 6 engages another tooth 3, thereby bringing about the next forward step of the ratchet wheel 2.

The flanks 3a and 3b of the ratchet teeth 3, with the embodiment of a step-by-step gear illustrated in the drawing, proceed parallel to one another and also the trip surfaces 9a and 9b of the carrier cutout 9 on the pawl 6 cooperating with the stepping gear are parallel with one another.

In order to make possible easy engaging and disengaging of the ratchet pawl 6 in relation to the pawl teeth 3 of the ratchet wheel 2 at any time, especially with the spoke wheels under unilateral load, and so that furthermore the ratchet wheel 2 when disengaged from the ratchet pawl 6 can be accurately centered in the occasionally executed step-by-step position, two centering and holding pawls 11 and 12 respectively are associated with the ratchet wheel 2. These centering and holding pawls 11 and 12 are each movable tonguelike against one another and against the flanks 3a and 3b of the ratchet teeth 3 through a toggle joint 13 and/or 14 by means of a drive unit 15 and/or 16, e.g. a pressure-medium cylinder. Through the centering and holding pawls 11 and 12 acting tonguelike against one another, the ratchet wheel 2 can thus be clamped tight after each trip-step in such a manner that the ratchet pawl 6 hinged to the arm 5 at 7 can be easily disengaged from a ratchet tooth 3 and after the arm 5 has been set back, the ratchet pawl can be engaged with the next ratchet tooth 3. At that moment the toggle joints 13 and 14 for the centering and holding pawls 11 and 12 are so adjusted that centering and holding of the ratchet wheel 2 occurs in the stretched lever position, whereas with the folded lever position the centering and holding pawls 11 and 12 are disengaged from the ratchet wheel 2. The drive units 15 and 16 are thus relieved of the holding force of the pawls 11 and 12 and merely have to fix the straightened position of the toggle levers 13 and 14 or bring them back to the folded position.

The engagement of the ratchet pawl 6 and of the centering and holding pawls 11 and 12 occurs alternatively, i.e. the ratchet pawl 6 is disengaged as soon as the centering and holding pawls 11 and 12 are engaged and the latter are disengaged after the ratchet pawl 6 has again been engaged with the next tooth 3 of the ratchet wheel 2.

According to the invention the two centering and holding pawls 11 and 12 are mounted through a double joint 17 and 18 to an arm 19, which also carries the toggle lever systems 13 and 14 and the drives 15 and 16 and which, limitedly movable back and forth, is mounted on the hub 4 of the ratchet wheel 2. Engaging this arm 19 is a push and pull rod 20 of a stationary driving mechanism, e.g. the piston rod of a pressure-medium cylinder.

As noted above it is a feature of the present invention to increase the stepping speed of the ratchet wheel and hence the shaft 1 in comparison with an ordinary stepping mechanism. Namely, as soon as a step is brought about through the arm 5 by the ratchet pawl 6 and the centering and holding pawls 11 and 12 have come into engagement and the ratchet pawl 6 is disengaged, it is possible by moving the arm 5 to bring about the next switch step in the same direction. Meanwhile the arm 5 is returned to its starting position and as soon as the switch step produced by the arm 19 has been carried out, the ratchet pawl 6 drops again into the ratchet wheel 2, whereupon the centering and holding pawls 11 and 12 are disengaged in order to make possible the next switch step through the arm 5.

Through the application of the step-by-step gear according to the invention it is thus possible to work with at least two different stepping speeds, whereby for the lower stepping speed only the arm 5 is moved and the arm 19 is blocked against motion, whereas for the higher stepping speeds the two arms 5 and 19 work alternatively. In order to avoid reciprocal obstruction of the ratchet pawl 6 and of the centering and holding pawls 11 and 12 during operation of the step-by-step gear, the centering and holding pawls 11 and 12 are to be arranged somewhat diametrically opposite the ratchet pawl 6.

As is revealed in FIGURE 2 there is advantage in forming the arm 5 carrying the ratchet pawl 6 by means of two cheeks 5a and 5b mounted on opposite sides of the ratchet wheel 2 on the latter's hub 4 and interconnected through the pivot 7 carrying the ratchet pawl 6 and the coupling pin 8a for the push and pull rod 8. Similarly, the arm 19 carrying the centering and holding pawls 11 and 12 as well as the toggle lever system 13 and 14 and the drive units 15 and 16 consists of two cheeks 19a and 19b on both sides of the ratchet wheel 2. In this case the cheeks 19a and 19b of the arm 19 are mounted on the hub 4 of the ratchet wheel 2 between the cheeks 5a and 5b of the arm 5. The cheeks 19a and 19b of the arm 19 can be rigidly interconnected at any point outside the peripheral range of the ratchet wheel 2.

In lieu of the pressure-medium cylinders used as drives, other drive units are likewise applicable. Thus it is conceivable, for example, to provide for electrohydraulic or electropneumatic lifting motors or one may use also electromechanical adjusting means.

The individual drive units of the step-by-step gear according to the invention can be so interconnected by a sequence switch system, that a fully automatic stepping becomes possible for the apparatuses consisting of spoke wheels for the cooling, hardening and/or conveying of roll materials, such operation, for example, being controlled independent of the charging and discharging of the individual rolled bar lengths through the relative spoke clearances.

Sequence switching can be performed hydraulically or pneumatically through valve controls or also electrically by means of limit switches.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:

1. In combination with a workpiece conveying apparatus, including a rotatable shaft, a step-by-step drive for said shaft comprising:
   a ratchet wheel drivingly connected to said shaft,
   a first arm rotatably carried by said shaft,
   a ratchet pawl carried by said arm adapted to be brought into driving engagement with the ratchet wheel,
   a second arm rotatably carried by said shaft,
   a centering pawl carried by said second arm,
   a holding pawl carried by said second arm,
   said centering and holding pawls adapted to be brought into engagement with said ratchet wheel,
   means for moving said first arm to effect rotation of said shaft by a controlled amount when said ratchet pawl is in engagement with said ratchet wheel,
   means for moving said second arm to effect rotation of said shaft by a controlled amount when said centering and holding pawls are in engagement with said ratchet wheel,
   said means for moving said arms being alternately employed,
   the construction being such that said centering and holding pawls when in engagement with said ratchet wheel centers and holds said shaft in a registered position it is caused to assume on movement by said pawl.

2. A step-by-step drive according to claim 1 wherein said centering and holding pawls are arranged diametrically opposite said ratchet pawls and at the periphery of said ratchet wheel.

3. In a step-by-step drive according to claim 1 including means for engaging and disengaging said ratchet pawl from said ratchet wheel.
   means for engaging and disengaging said centering and holding pawls from said ratchet wheel.

4. In a step-by-step drive according to claim 3 in which said means for causing engagement and disengagement of said ratchet pawl and said centering and holding pawls comprise piston cylinder assemblies.

5. In a step-by-step drive according to claim 3 wherein said centering and holding pawls are connected together through a toggle lever,
   said means for causing engagement and disengagement of said centering and holding pawls connected to said toggle lever,
   the construction being such that when said centering and holding pawls are in engagement with said ratchet wheel the toggle lever is in a generally straightened-out extended position.

6. In a step-by-step drive according to claim 1 in which each of said arms consist of a pair of arms, one arm of each pair being mounted on opposite sides of said ratchet wheel, whereby each of the arms that carry said centering and holding pawls is arranged between the arms carrying said ratchet pawls and said ratchet wheel.

References Cited

UNITED STATES PATENTS

| 2,488,766 | 11/1949 | De Moss | 74—142 |
| 2,660,895 | 12/1953 | Waters | 74—142 |
| 3,242,746 | 3/1966 | Seiden | 74—142 |

FOREIGN PATENTS

| 548,875 | 10/1956 | Italy. |

FRED C. MATTERN, Jr., *Primary Examiner.*

W. S. RATLIFF, *Assistant Examiner.*